Jan. 19, 1965  F. KAPPIS ETAL  3,166,389
HOT GAS ELECTROFILTER
Filed Oct. 28, 1960  4 Sheets-Sheet 1
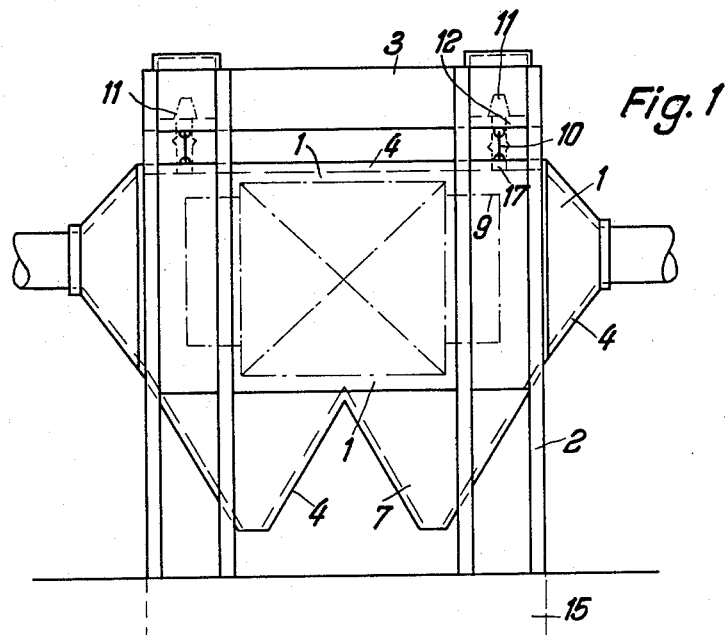
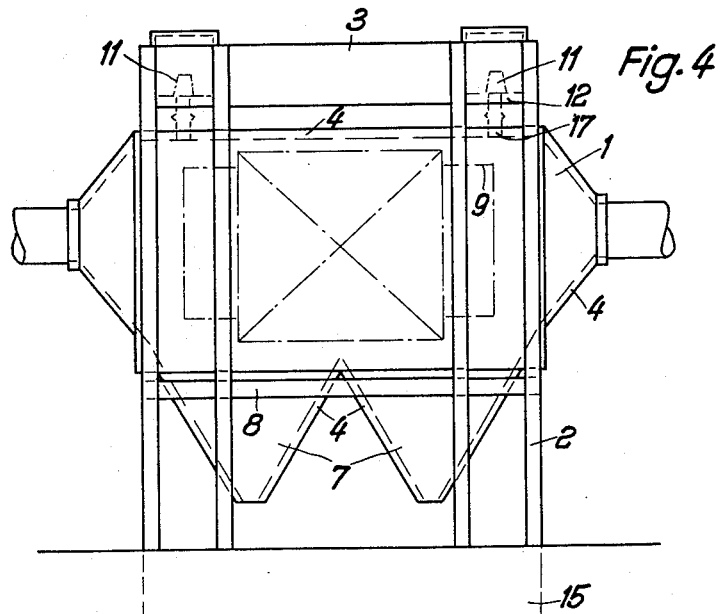
Inventor:
Friedrich Kappis
Jean Wiemer
By Bailey, Stephens, Huettig
Attorneys

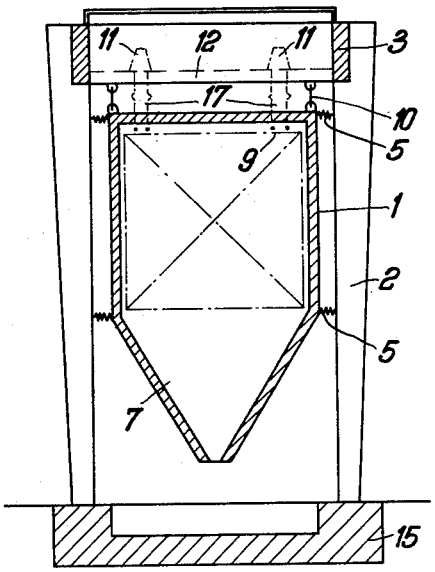

Inventor:
Friedrich Kappis
Jean Wismer

United States Patent Office

3,166,389
Patented Jan. 19, 1965

3,166,389
HOT GAS ELECTROFILTER
Friedrich Kappis, Essen-Uberruhr, and Jean Wiemer, Oberhochstadt, Taunus, Germany, assignors to Metallgesellschaft Aktiengesellschaft, Frankfurt am Main, Germany, a corporation of Germany
Filed Oct. 28, 1960, Ser. No. 65,853
Claims priority, application Germany, Nov. 18, 1959, M 43,420
2 Claims. (Cl. 55—146)

The invention relates to electrofilters, and particularly to electrofilters for filtering dust from hot gases.

It has been known to use for the removal of dust from corrosive gases electrofilters with housings of brick work or concrete. These housings consist of walls and a cover of a thickness of at least 20 to 40 cm. and more. In the conventional concrete structures, changes in the cross-sectional form of the supports and beams connected with the stationary wall, which may be for example be cast integral with the wall, are common, because the loads on the interior filter elements such as the discharge spaces, the precipitating electrodes or the insulators as well as the exterior filter elements such as stabilizers must be transmitted through them to the base or foundation.

A certain thickness is also required for the purpose of heat insulation. For the purpose of cleaning hot acid gases, it has been found that the electrofilter housing formed of reinforced concrete of ordinary construction has substantial disadvantages. Because of the great temperature differences between the temperatures inside and outside the electrofilter housing there arise in the thick concrete walls strong temperature differences, which lead to changes in dimensions and to mechanical stresses in the concrete, so that often cracks arise and the walls are not gas-tight. Because of the varying cross-sections which are absolutely necessary for the purpose of mechanical stability, there arise, with constant temperatures inside the electrofilter housing, variable temperatures on the outer walls which can lead to uncontrolled ratios of stress in the construction and often to the formation of cracks.

The present invention has the purpose of providing a construction which overcomes these disadvantages of the prior art devices.

A primary object of the invention is to decrease to a minimum or to prevent altogether harmful temperature differences in the housing walls.

Another object of the invention is to provide an arrangement in which the mechanical stresses which exist inside the concrete walls can be easily controlled.

According to the invention, this problem is solved by constructing the complete electrofilter of two structural parts electrically insulated from each other, the filter housing being for example of structural cement and as thin walled as possible and therefore not necessarily self-supporting (hereinafter referred to as the "warm" construction) and being provided with heat insulation and the second part consisting of a frame of reinforced concrete or the like (hereinafter referred to as "cold" construction) in which the filter housing is freely movable, by hanging or by being otherwise supported in the frame. In this way the weight of the filter housing as well as the discharge and precipitating electrodes arranged therein are transmitted to the cold frame structure, for which purpose the mounting and supporting insulators are mounted between a double truss of the frame. Because of the thin walls which are possible with this construction (their thickness when formed of concrete lies in practical applications for example between 10 and 20 cm.), the electrofilter housing which either hangs free in the reinforced concrete frame or slides on guides or rollers, and which additionally is heat insulated, can be subjected to no high harmful temperature differentials in the concrete walls and especially to no such temperature differences in the frame construction which is insulated from the housing. An insignificant temperature expansion in the walls of the warm construction cannot lead to destruction of the walls or to the formation of cracks, because the warm construction itself can expand as desired, since according to another feature of the invention it is not rigidly connected with the cold construction or with the foundation, but through expansion or sliding means for example slide guides or the like it is arranged freely movable in the frames.

The electrofilter housing is, according to the invention, so constructed that the temperature drop inside the reinforced concrete walls and cover of the warm construction does not exceed 20° C. The dust hoppers are, if desired, supported from the electrofilter through expansion joints. For protection against the weather the whole outer surfaces can for example be coated with known insulating material. In order to take up smoothly the expansions and occasional movements (for example from wind pressure) of the warm construction in the frames, the electrofilter housing (warm construction) is supported by springs with respect to the reinforced concrete frames (cold construction). It lies within the scope of the invention to use, instead of the reinforced concrete cold frame construction, an iron construction, in which the reinforced concrete electrofilter housing of the previously described light construction hangs or is supported. It is also possible within the invention to make the warm construction of some other material than reinforced concrete, such as synthetic resin or metal, for example, light metals suitably insulated from the cold frame construction.

The advantage of the construction according to the invention consists in the fact that the electrofilter housing, in contrast to conventional ones, has especially high elasticity, so that no cracks in the walls can arise as a consequence of changes in dimensions or as a consequence of too great temperature differences between the inside of the housing and its surroundings, so that drawing in of false air is not necessary and the essential supporting construction is not warmed, but remains practically at the same temperature as its surroundings. In this way it is possible to work at considerably higher temperatures than heretofore. Tests have shown that the maximum temperature lies at 250 to 300° C. Also the new construction has an increased reliability of operation and, when it is made exclusively of reinforced concrete, a high saving in material, as much as 25%, as compared to conventional concrete electrofilters is possible.

Further objects and advantages of the invention will appear more fully from the following description especially when taken in conjunction with the accompanying drawings, which form a part thereof.

FIG. 1 shows in side elevation a filter embodying the invention;

FIG. 2 is a cross-section through the electrofilter of FIG. 1;

FIG. 3 is a cross-section through another form of electrofilter;

FIG. 4 is a side elevation of another modification;

Figure 2A:
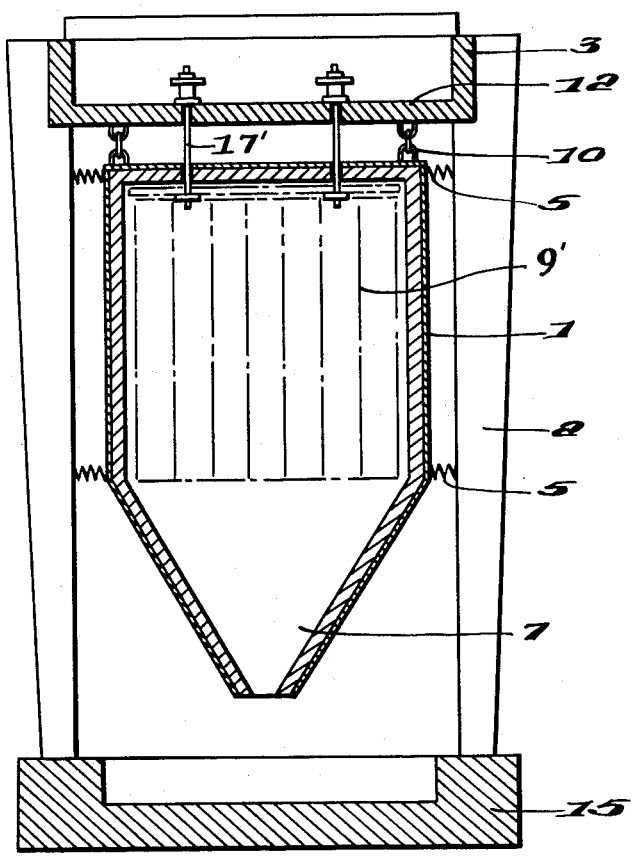
FIG. 2a is a cross-section showing the mounting of the precipitating electrodes.

In the drawings, with reference to FIGS. 1 and 2, the electrofilter housing is indicated at 1. This is suspended in the frames 2 which constitute the cold construction. The frames are connected by longitudinal beams 3. The wall of the electrofilter housing is provided with an insulating layer 4, for example, of fibre sheets bonded with cement.

In the form of the invention shown in FIGS. 1, 2 and 3, the electrofilter housing is hung on hangers 10 in the frames 2, being suspended from the webs 12 of the frame. Steel springs 5 are provided between the side walls of the electrofilter housing and the uprights of the frames in order to prevent contact therebetween and to damp any movement of the electrofilter housing.

The discharge electrodes 9 are carried by high tension insulators 11 through hangers 17, which pass freely but gas-tightly through the lid of the housing. The precipitating electrodes 9', as shown in FIG. 2a, are carried in a similar manner from the frame by hangers 17', but without the interposition of insulators. The supply of high tension current can take place through the insulators 11, which are constructed as lead-through insulators.

The dust bins 7 are, in the form of FIGS. 1 and 2, directly connected with the electrofilter housing. In the form of FIG. 3, the hoppers 13 are connected with the electrofilter housing gas-tightly by expansion joints 14. The reinforced concrete frame constructions 2 are secured on a base 15, which may be below or partly above the earth.

In the form of FIG. 3, the hopper 13 is so constructed that it rests with its lower part on a slide 16 which may be provided with a lubricating medium.

Figure 5:
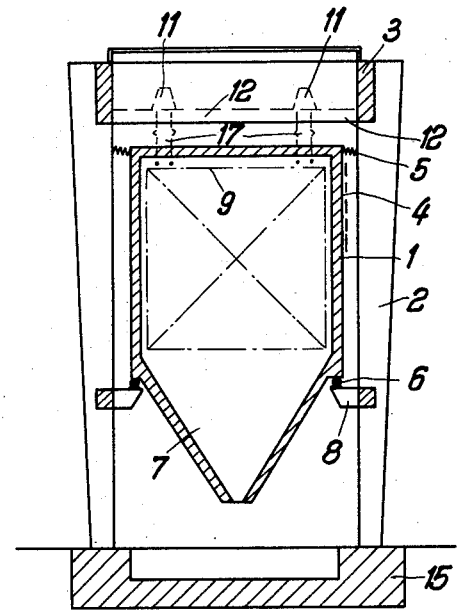
FIG. 5 is a cross-section through the electrofilter of FIG. 4.
Figure 6:
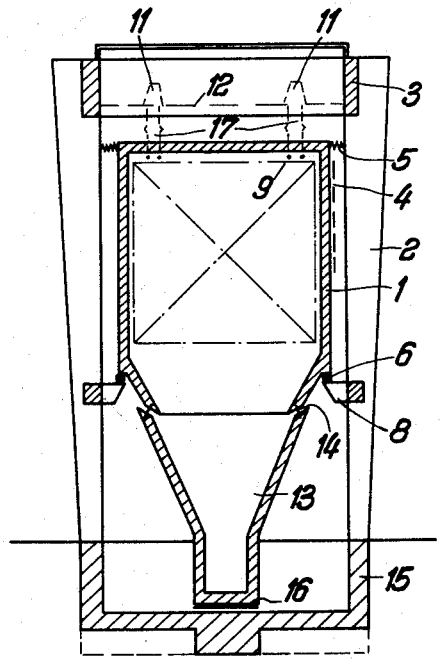
FIG. 6 is a cross-section through a further modification.

In the form of FIGS. 4 and 5, as well as in that of FIG. 6, the filter housing rests on guides 6 carried by brackets 8, these guides being formed of lubricating material.

The guides 6 are also of an insulating material as are the brackets 8.

While we have described herein some embodiments of our invention, we wish it to be understood that we do not intend to limit ourselves thereby except within the scope of the claims hereto or hereinafter appended.

We claim:

1. A hot gas electrofilter comprising a reinforced concrete frame, a filter-housing of reinforced concrete of a thickness of not over 20 cm. within the frame, discharge and precipitating electrodes within said filter housing, means directly supporting said discharge electrodes from said frame independently of the filter-housing and electrically insulating said discharge electrodes from said frame, means directly supporting the precipitating electrodes from said frame independently of the filter-housing, a layer of insulation around the outside of said housing, and means resiliently mounting said filter-housing in the frame, whereby the temperature drop in the walls of the filter-housing does not exceed 20° C.

2. An electrofilter housing as claimed in claim 1, having a dust hopper, and expansion joints connecting the dust hopper with the filter housing.

References Cited in the file of this patent

UNITED STATES PATENTS

| | | |
|---|---|---|
| 2,057,610 | Diehl | Oct. 13, 1936 |
| 2,101,786 | Wise | Dec. 7, 1937 |
| 2,508,133 | Andersen | May 16, 1950 |

FOREIGN PATENTS

| | | |
|---|---|---|
| 338,492 | Great Britain | Nov. 18, 1930 |
| 816,691 | Germany | July 8, 1949 |